KEIZO SHIMANO AND
TAKASHI SEGAWA INVENTORS

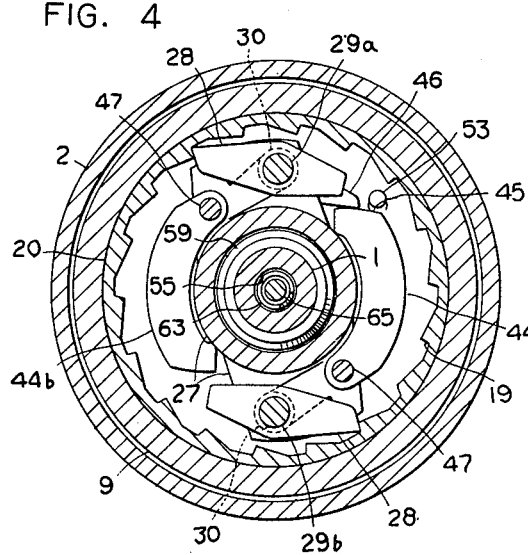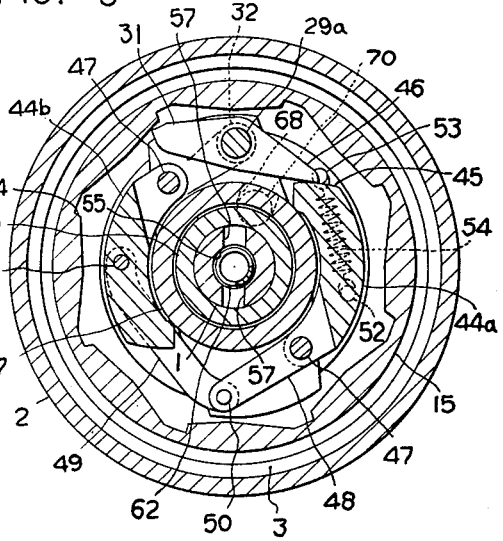

United States Patent Office 3,492,893
Patented Feb. 3, 1970

3,492,893
THREE-STAGE SPEED CHANGE BICYCLE HUB WITH BUILT-IN AUTOMATIC SPEED CHANGE MECHANISM
Keizo Shimano and Takashi Segawa, Sakai, Osaka, Japan, assignors to Shimano Kogyo Kabushiki Kaisha, Sakai, Osaka, Japan
Filed July 17, 1968, Ser. No. 745,626
Claims priority, application Japan, Aug. 11, 1967, 42/51,741
Int. Cl. F16h *3/74;* B62m *9/10*
U.S. Cl. 74—752                    1 Claim

ABSTRACT OF THE DISCLOSURE

Three-stage speed change device built in a rear wheel hub of a bicycle, comprising a planetary gear mechanism which may be automatically controlled by the action of centrifugal governor weights associated therewith, as well as by a manually actuable control means.

---

Heretofore it has been proposed a rear wheel hub of a bicycle, which is equipped with a built-in multi-stage speed change mechanism adapted to be manually controlled to obtain change-over of desired speed-ratio transmission condition. It has also been proposed to provide an automatically controlled speed change hub, in which centrifugal governor weights responsive to the running speed of the bicycle are provided for automatic change-over of said built-in speed change mechanism. With respect to the above-mentioned manually controlled speed change hub, not only the manual control is very troublesome, but also it requires driver's skill for selecting appropriate speed-ratio transmission condition. With respect to the hub with the automatic speed change mechanism, on the other hand, it is necessary for the driver to effect selection of the required speed-ratio transmission condition for control. However, on the other hand, with respect to the latter type of the speed change mechanism, the speed-ratio transmission condition is automatically changed-over irrespective of the driver's will and strength of his legs, so that the change-over of speed-ratio cannot be effected at driver's will or following his taste.

The principal object of this invention is to provide a new and improved speed change mechanism for a bicycle, in which the above-mentioned disadvantage and defect of the conventional manually controlled and automatically controlled speed change mechanisms are removed. Other objects of this invention will become apparent from the following detailed description taken in conjunction with the accompanying drawings wherein:

FIGURES 2 to 5 are cross sections along lines II—II, III—III, IV—IV and V—V, respectively, of FIGURE 1; and FIGURES 6 and 7 are cross sections corresponding to FIGURES 3 and 5, respectively, showing various parts in the position when the centrifugal governor weights are put into operation.

Figure 1:
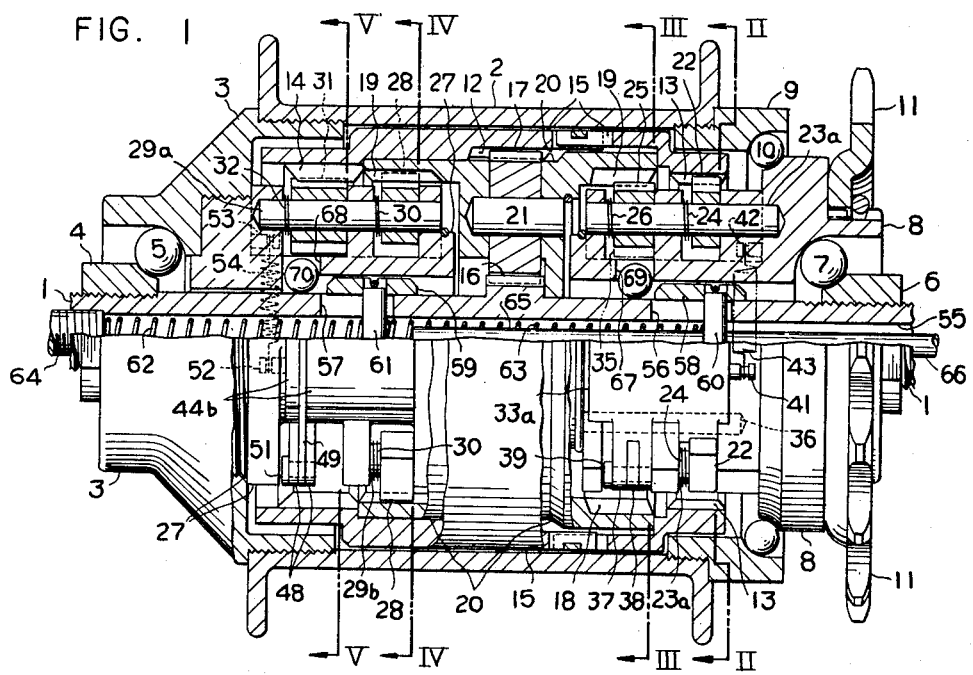
FIGURE 1 is a longitudinal section of the three-stage speed change hub according to this invention, showing various parts under the condition of reduced speed-ratio transmission.

Referring to FIGURE 1, on a rear dead axle 1 there is rotatably mounted a hub shell 2 through a mount drum 3, an inner race cone 4 fixed to the lefthand end of the axle 1, and bearing balls 5. At the righthand end of the axle 1, the hub shell 2 is mounted thereon through a mount drum 9 fixed to the righthand end of the hub 2, bearing balls 10, a driving sleeve 8 having a driving sprocket wheel 11 fixed thereto, bearing balls 7, and a second inner race cone 6 fixed to the axle 1.

Figure 2:
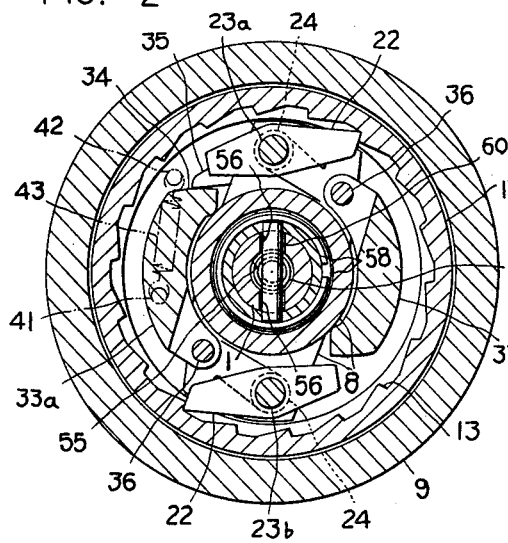

At the mid portion, the inner wall of the hub shell 2 is provided with an internal gear 12. 15 is a ratchet wheel carrier body splined and carrying an internal ratchet wheel 13 at the righthand end portion and an internal ratchet wheel 14 at the lefthand portion. Between and meshing with a sun gear 16 on the axle 1 and the internal gear 12, there are a plurality of planetary pinions 17, each loosely mounted on axis 21 and carried by a planet carrier frame 20, which carrier frame 20 is provided with internal ratchet wheels 18 and 19 respectively arranged on the righthand end portion and on the lefthand end portion, whereby forming a planetary gear mechanism. On the driving sleeve 8, there are a plurality of low speed-ratio transmission pawls 22 pivoted on pivots 23a and 23b (FIG. 2) and arranged in such position that the noses thereof are biassed by springs 24 to be brought into operative engagement with the internal ratchet wheel 13, whereby forming a low speed-ratio transmission ratchet gearing. At the righthand end portion of the planet carrier frame 20, in the position facing to the internal ratchet wheel 18, there is a high speed-ratio transmission pawl 25 pivoted on said pivot 23a with its nose biassed by a spring 26 to be brought into operative engagement with the internal ratchet wheel 18, whereby forming a high speed-ratio transmission ratchet gearing. With respect to the lefthand mount drum 3 of the hub shell, there extends rightwardly a driven drum 27, and there are a plurality of low speed-ratio transmission pawls 28 pivoted on pivots 29a and 29b (FIG. 4), each biassed by a spring 30 having a tendency of bringing the nose thereof into operative engagement with the internal ratchet wheel 19 on the planet carrier frame 20, whereby forming a low speed-ratio transmission ratchet gearing. At the position facing to the internal ratchet wheel 14 on the ratchet wheel carrier body 15, there is a high speed-ratio transmission pawl 31 pivoted on said pivot 29a (FIG. 5) which is biassed by a spring 32 having a tendency of bringing the nose of said pawl 31 into operative engagement with the internal ratchet wheel 14, whereby forming a high speed-ratio transmission ratchet gearing.

Figure 3:
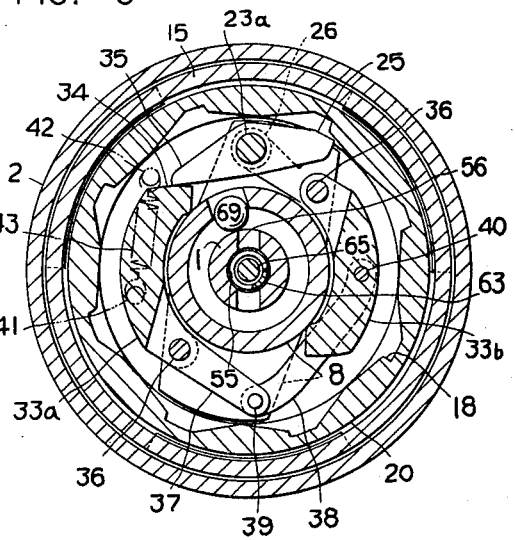

With respect to the driving sleeve 8, utilizing the portion not provided with said pivoted pawls 22 and 25, there are provided main and auxiliary centrifugal governor weights 33a and 33b (FIGS. 1 to 3), the main governor weight 33a having an arcuate abutting face 34 facing to the tail 35 of the high speed-ratio transmission pawl 25. Both governor weights 33a and 33b are separately oscillatably mounted on separate pivot 36 and arranged symmetrically with respect to the axis of the hub. In order to prevent defective operation due to vibration, the governor weights 33a and 33b are so connected to be simultaneously oscillated inwardly or outwardly relative to the axis of the hub. Thus, when the speed of rotation of driving sleeve 8 is lower than predetermined speed, the both governor weights 33a and 33b will be held in inwardly oscillated position by the action of said spring 43 against the action of centrifugal force, so that the abutting face 34 of the main governor weight 33a will abut against the tail 35 of the high speed-ratio pawl 25, whereby keeping the tip of the pawl 25 out of operative engagement with the internal ratchet wheel 18. On the other hand, when the speed of rotation of said driving sleeve 8 is increased for predetermined degree, the governor weights 33a and 33b will be oscillated outwardly against the action of the spring 43, whereby automatically releasing the suppression of the abutting face 34 of the weight from the tail 35 of the high speed-ratio transmission pawl 25, thereby allowing the tip of the pawl 25 to be brought into operative engagement with the internal ratchet wheel 18.

With respect to said driven drum 27, at the portion not having the driving pawls 28 and 31, there are provided main and auxiliary centrifugal governor weights 44a and 44b (FIGS. 1 to 5), similarly arranged as the governor weights 33a and 33b provided on the driving sleeve 8. Each of the governor weights 44a and 44b is oscillatably mounted on separate pivot 47, and both are arranged symmetrically with respect to the axis of the hub. The arcuate abutting face 45 is held in abutment with the tail 46 of the high speed-ratio transmission pawl 31. Both governor weights 44a and 44b are so arranged to be simultaneously oscillated relative to the axis of the hub. The tail 48 of the main governor weight 44a is connected to the auxiliary governor weight 44b by means of a link 49 and pins 50 and 51. The main governor 44a has a hook 52 which is connected by means of a tension spring 54 to a hook 53 on the driven drum 27, so that the tips of both governor weights have a tendency of being oscillated inwardly toward the axis of the hub. So far as the speed of rotation of the driven drum 27 is lower than predetermined speed, the both governor weights 44a and 44b are held in inwardly oscillated position by the action of the tension spring 54, with the abutting face 45 of the main governor weight 44a abutting against the tail 46 of the high speed-ratio transmission pawl 31, whereby keeping the latter out of operative engagement with the internal ratchet wheel 14 (FIG. 5). When, on the other hand, speed of rotation of the driven drum 27 is increased over the predetermined speed, the main and auxiliary governor weights 44a and 44b will be oscillated inwardly against the action of the tension spring 54, whereby suppression of the tail 46 of the high speed-ratio transmission pawl 31 will be automatically released, so that the tip of the pawl 31 is allowed to go into operative engagement with the internal ratchet wheel 14.

The axle 1 is provided with a concentric bore 55 throughout its length, and there are axially extended slots 56 (in righthand portion) and other similar slots 57 (in lefthand portion), both arranged diametrically. In the vicinity of said slots 56 and 57, there are provided control sleeves 58 and 59, respectively, each having a bevelled guide edge at its lefthand end. Diametrically disposed pins 60 and 61 are fitted in said control sleeves 58 and 59, respectively, the arrangement being such that according to any axial movement of said pins 60 and 61 said control sleeves 58 and 59 are actuated accordingly. In said bore 55, a spring 62 is inserted and, between the pins 60 and 61, there is inserted another spring 63. 64 is a plug at the lefthand end of the bore 55. 65 is an intermediate rod inserted between the pins 60 and 61. 66 is a push rod inserted into the bore 55 and abutting against the first pin 60. This push rod 66 is adapted to be manually pushed in through any manual controlling means. It will be seen that the second pin 61 may move leftwardly only upon the leftward movement of the first pin 60 for its full stroke. Thus, the pins 60 and 61 may actuate the control sleeves 58 and 59 leftwardly or rightwardly. In the driving sleeve 8 and the driven drum 27, there are holes 67 and 68 respectively, which are receiving balls 69 and 70 respectively. It will be seen that when the control sleeve 58 is leftwardly moved for a predetermined extent, the ball 69 will be raised outwardly or radially as actuated by the bevelled edge of the control sleeve 58, whereby the tail of the high speed-ratio transmission pawl 25 is pushed by the ball 69 to release the operative engagement of said pawl 25 with the internal ratchet wheel 18. When the control sleeve 58 is moved leftwardly for its full stroke, thereby moving the second control sleeve 59 leftwardly, the ball 70 will be raised radially or outwardly raising thereby the tail of the high speed-ratio transmission pawl 31 and releasing the operative engagement of the pawl 31 with the internal ratchet wheel 14. In order to attain relatively quick action of operative engagement of the ratchet gearing disposed between the driving sleeve 8 and the planet carrier frame 20, the spring 43 for the centrifugal governor weights 33a and 33b is set relatively strong, whilst the spring 54 for the centrifugal governor weights 44a and 44b is set relatively weak so as to attain the engagement of the ratchet gearing disposed between the driven drum 27 and the ratchet wheel carrier body 15, at relatively low speed of rotation.

The operation of the device according to this invention is described as follows: Under the high speed-ratio transmission condition as shown in FIGS. 1 to 5, in which the push rod 66 is not pushed in, the control sleeves 58 and 59 are held in their rightwardly pressed position as acted by the springs 62 and 63, so that both high speed-ratio transmission ratchet gearings are under the control of the governor weights. When the driving speed is relatively low as at start of bicycle driving, transmission of rotation of the driving sprocket wheel 11 will be made through the driving sleeve 8, the low speed-ratio transmission pawl 22, the ratchet wheel carrier body 15, the internal gear 12, the planetary pinions 17, the planet carrier frame 20, the internal ratchet wheel 19, the low speed-ratio transmission pawl 28, the driven drum 27 and the mount drum 3, whereby the hub 2 will be driven under the low speed-ratio transmission condition. Upon increase of speed of rotation of the hub 2, the main and auxiliary centrifugal governor weights 44a and 44b will be oscillated outwardly against the action of the spring 54, whereby bringing the high speed-ratio transmission pawl 31 into operative engagement with the internal ratchet wheel 14, and the speed of rotation of the driving sprocket wheel 11 will be transmitted through the driving sleeve 8, the low speed-ratio transmission pawl 22, the internal ratchet wheel 13, the internal ratchet wheel carrier body 15, the internal ratchet wheel 14, the high speed-ratio transmission pawl 31, the driven drum 27 and the mount drum 3, to the hub 2 which will be rotated under the normal speed-ratio transmission condition through direct connection. Upon further increase of the driving speed of said sprocket wheel 11, the main and auxiliary governor weights 33a and 33b will be outwardly oscillated against the action of the spring 43 as shown in FIG. 6, whereby the high speed-ratio transmission pawl 25 is brought into operative engagement with the internal ratchet wheel 18. Thus, the rotation of the sprocket wheel 11 will be transmitted to the hub 2 under the increased speed-ratio transmission condition, through the driving sleeve 8, the high speed-ratio transmission pawl 25, the internal ratchet wheel 18, the planet carrier frame 20, the planetary pinions 17, the internal ratchet wheel 12, the internal gear carrier body 15, the internal ratchet wheel 14, the high speed-ratio transmission pawl 31, the driven drum 27 and the mount drum 3. Under said normal speed-ratio transmission condition and under increased speed-ratio transmission condition, whilst the low speed-ratio transmission pawl 22 is in operative engagement with the internal ratchet wheel 13, on the other hand, the internal ratchet wheel 13 is always rotated at speed higher than the speed of the adjacent internal ratchet wheel 18, so that the low speed-ratio transmission pawl 13 is substantially ineffective. It is also to be understood that the low speed-ratio transmission pawl 28 on the driven part is held in operative engagement with the internal ratchet wheel 19 under increased speed-ratio transmission condition. But, the driven drum 27 always rotates at high speed and is substantially ineffective under such transmission condition. Now, when the push rod 66 is pushed in for a predetermined degree, shifting only the control sleeve 58, without affecting the other control sleeve 59 for actuating the ball 70, whereby raising the ball 69 outwardly to raise the tail of the high speed-ratio transmission pawl 25, thereby holding said pawl out of operative engagement with the internal ratchet wheel 18, thus maintaining the moderate speed-ratio transmission condition. Under such condition, so far as the driving speed of the sprocket wheel 11 is low, the hub 2 will be driven at decreased speed transmission condition. On the other hand, when speed of rotation of the hub 2 is increased and the high speed-ratio transmission pawl 31 is brought into operative engagement with the internal ratchet wheel 14 as acted upon by the centrifugal governor weights 44a and 44b, the hub 2 will be driven under said normal speed transmission condition.

When the push rod 66 is pushed in for its full stroke, the balls 69 and 70 will be raised outwardly by respective control sleeves 58 and 59, whereby holding the high speed-ratio transmission pawls 25 and 31 out of operative engagement with the internal ratchet wheels 18 and 14 respectively, irrespective of the action of centrifugal governor weights, thus maintaining the low speed-ratio stage. Under such condition, the hub 2 is always driven through reduced speed-ratio transmission route, irrespective of speed of driving rotation of the sprocket wheel 11.

In short, in the high speed stage, driving of low speed rotation is effected through the reduced speed-ratio transmission route; the driving of normal speed is effected through directly connected normal speed-ratio transmission route, and driving of high speed rotation is effected through increased speed-ratio transmission route. In the normal speed stage, driving of low speed rotation is effected through reduced speed-ratio transmission route; the driving of normal speed rotation is effected through the normal speed-ratio transmission direct route; and in the low speed stage the transmission is always effected through reduced speed-ratio transmission route.

In case the high speed-ratio transmission condition has been changed-over to the low speed-ratio transmission condition, or in case of stop of driving of the bicycle after the low speed-ratio driving, the high speed-ratio transmission pawl 25 or 31 will not return back to the initial position remaining in engagement with the internal ratchet wheel 18 or 14, so that still continuing the transmission condition at high speed. However, by back pedalling or stopping of pedalling, the driving sleeve 8 will be rotated in the reverse direction relative to the internal ratchet wheel 18, whereby the tail 35 of the pawl 25 will be brought into contact with the abutting face 34 of the main governor weight 33a. Alternatively, the control sleeve 58 may be momentarily moved leftwardly, whereby bringing the high speed-ratio transmission pawl 25 out of engagement with the internal ratchet wheel 18. Or, the other control sleeve 59 may be momentarily moved leftwardly, whereby bringing the high speed-ratio transmission pawl 31 out of engagement with the internal ratchet wheel 14. Thus, various parts will be set ready for next automatic speed change.

In the aforementioned embodiments of this invention, the high speed-ratio transmission pawl 21 is brought into engagement with the internal ratchet wheel 14 during relatively low speed driving, and the high speed-ratio transmission pawl 25 is brought into engagement with the internal ratchet wheel 18 during relatively high speed driving. On the contrary, it may be so operated that the high speed-ratio transmission pawl 25 is brought into operative engagement with internal ratchet wheel 18 during relatively low speed driving, and that the high speed-ratio transmission pawl 31 is brought into operative engagement with the internal ratchet wheel 14 during the relatively low speed driving. In the latter case, it is preferable that, with respect to the control sleeves 58 and 59, according to the leftward stroke thereof for shorter stroke, only the high speed-ratio transmission pawl 31 may be maintained out of operative engagement with the internal ratchet wheel 14, without suppressing the operative engagement of the high speed-ratio transmission pawl 25.

From the foregoing, according to this invention, it will be seen that the centrifugal governor weights responsive to the driving speed are associated with the high speed-ratio transmission ratchet gearing on the driving side and with the high speed-ratio transmission ratchet gearing on the driven side respectively, and that said two high speed-ratio ratchet gearings are controlled to be in operative engagement or disengaged by a manual controlling means provided outside of the built-in mechanism, and that as a result it is possible to select any desired speed-ratio change, i.e. the low speed stage (in which the low speed-ratio transmission condition is maintained), the normal speed stage (in which the reduced speed-ratio transmission condition and the normal speed-ratio transmission condition may be automatically changed-over according to desired driving speed of rotation), and to the high speed stage (in which the reduced speed-ratio transmission condition, the normal speed-ratio transmission condition, and increased speed-ratio transmission condition, may be automatically changed-over according to desired speed of rotation).

Moreover, in any speed change stage, driving may be started under reduced speed-ratio transmission condition, so that when the driver has to frequently stop the bicycle, he may drive safely and comfortably. On driving on up-hill road, the driver may select the reduced speed-ratio transmission condition, and may suppress any automatic speed change-over operation by the action of the centrifugal governor weights.

What we claim is:

1. Three-stage speed change bicycle hub with built-in automatic speed change mechanism, comprising a planetary gear mechanism which consists of a rigid sun gear, planetary pinions carried by a planet carrier frame, and an internal gear, said planetary gear mechanism being disposed between a driving sleeve and a hub shell, wherein said driving sleeve and said planet carrier frame and said internal gear are associated with a righ speed-ratio transmission ratchet gearing and a low speed-ratio transmission ratchet gearing respectively, and wherein said hub shell, said internal gear and said planet carrier frame are associated with another high speed-ratio transmission ratchet gearing and the low speed-ratio transmission ratchet gearing respectively, and wherein a manual control means is provided adapted for putting into or out of operative engagement of said two high speed-ratio transmission ratchet gearings for attaining change-over of three change speed stages, and wherein centrifugal governor weights responsive to the speed of rotation are separately provided associated with said two high speed-ratio transmission ratchet gearings respectively for controlling operative engagement or disengagement of said high speed-ratio transmission ratchets gearings, said parts being so arranged that three change speed stages may be obtained, i.e. the low speed stage maintaining the reduced speed-ratio transmission condition, the intermediate speed stage in which driving may be started under reduced speed-ratio transmission condition and automatically changed-over to the normal speed-ratio transmission condition, and the high speed stage in which driving may be started under reduced speed-ratio transmission condition and according to increase of speed of rotation the reduced speed-ratio transmission condition may be automatically changed-over to increased speed-ratio transmission condition through the normal speed-ratio transmission condition.

References Cited

UNITED STATES PATENTS

| 3,021,728 | 2/1962 | Shimano | 74—750 |
| 3,122,226 | 2/1964 | Schuller et al. | 74—750 X |
| 3,180,167 | 4/1965 | Paschakarnis | 74—752 X |
| 3,366,206 | 1/1968 | Shimano | 74—750 X |
| 3,369,429 | 2/1968 | Kimpflinger et al. | 74—752 |

ARTHUR T. McKEON, Primary Examiner